United States Patent [19]
Lovell

[11] 3,791,347
[45] Feb. 12, 1974

[54] ANIMAL HANDLER

[76] Inventor: Melvin V. Lovell, 12433 N. 70th St., Scottsdale, Ariz. 85254

[22] Filed: Apr. 30, 1973

[21] Appl. No.: 355,771

[52] U.S. Cl. .................................. 119/19, 119/17
[51] Int. Cl. ............................................. A01k 01/02
[58] Field of Search .................... 119/17, 19, 96, 99

[56] References Cited
UNITED STATES PATENTS

| 459,216 | 9/1891 | Sumner | 119/19 X |
| 2,470,223 | 5/1949 | Powels | 119/19 |
| 3,399,654 | 9/1968 | Schroer | 119/17 X |
| 3,467,064 | 9/1969 | Glass et al. | 119/17 |
| 3,494,330 | 2/1970 | Santagata et al. | 119/17 |

Primary Examiner—Louis G. Mancene
Assistant Examiner—James H. Czerwonky
Attorney, Agent, or Firm—Cahill, Sutton & Thomas

[57] ABSTRACT

A plurality of bars are mounted within a pivotable frame across the top of an animal carrier to provide ventilation and light. By pivoting the frame, the animal can be taken out of the carrier and the interior of the carrier is readily accessible for cleaning purposes. A cover, including a handle, is releasably attached to the frame to darken the interior of the carrier and protect the animal while it is being transported. One end of the carrier includes a laterally sliding panel through which food and water can be supplied to the animal. The entire floor of the carrier is slidably movable toward the bars and is properly aligned by guide means. With the cover removed and the carrier laid on its side, the animal can be immobilized against the bars by moving the floor toward the bars. Thus, medication or medical treatment can be administered to the animal without removing it from the carrier or attaching restraining devices to the animal.

7 Claims, 4 Drawing Figures

PATENTED FEB 12 1974 3,791,347

ANIMAL HANDLER

The present invention relates to animal carriers, and more particularly, to animal carriers including movement restrictive elements for immobilizing the animal to permit medication to be administered to the animal.

Animal carriers are widely used when an animal is to be transported from one location to another. In particular, they are particularly necessary when the animal is capable of inflicting serious injury to its handlers or to itself should it become excited or rambunctious. When the animal is transported to a veterinarian for medication or medical treatment, the animal must usually be removed from within the carrier and physically constrained in order to receive the medication or medical treatment. The constraining devices, in combination with the strange surroundings and smells, can and does cause the animal to go into a state of shock or become hyperactive in an attempt to free itself from its bonds. If the animal does go into a state of shock, th medical treatment is further complicated and if the animal becomes hyperactive, there is a distinct danger of the animal causing injury to itself or to its handlers.

In order to lessen the trauma associated with a visit to a veterinarian's office, several types of animal carriers have been developed to transport the animal and include apparatus for immobilizing the animal within the container. An example of such a carrier is shown in U.S. Pat. No. 3,494,330, wherein a portion of the carrier is pivotable inwardly to constrain the animal between the pivotable portion and the interior walls of the container. In U.S. Pat. No. 3,467,064, is disclosed a semicylindrical cage wherein a portion of the front of the cage pivots inwardly to sweep the cage and ultimately restrain the animal within the cage. In U.S. Pat. No. 3,399,654, a sliding imperforate wall of an animal cage is used to restrain an animal against the bars of the cage.

A primary object of the present invention is to provide an animal carrier for transporting animals, which carrier includes apparatus for restraining the physical movement of the animal.

Another object of the present invention is to provide animal restraining apparatus within an animal carrier.

Still another object of the present invention is to provide apparatus for restraining an animal within a carrier, which apparatus forms a structural part of the carrier.

Yet another object of the present invention is to provide a means for restraining an animal within a familiar environment.

A further object of the present invention is to provide an animal carrier particularly adapted for nocturnal animals, which carrier includes apparatus for restraining movement by the animal.

A yet further object of the present invention is to provide a compact fully enclosed animal carrier having removable panels to provide ventilation, light, and ready access for housekeeping purposes.

These and other objects of the present invention will become apparent to those skilled in the art as the description thereof proceeds.

The present invention may be described with more specificity and clarity with reference to the following drawings, in which.

Figure 1:
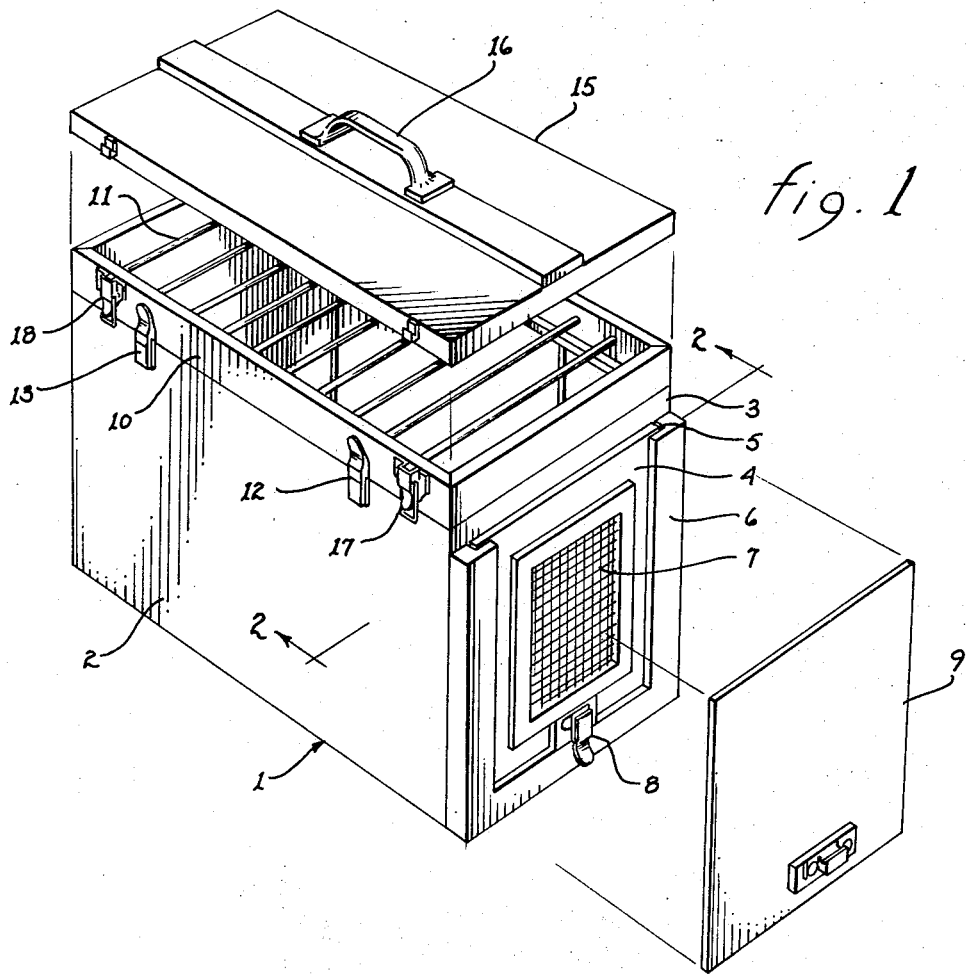
FIG. 1 illustrates an isometric view of the present invention.

Referring to FIG. 1, there is shown an animal carrier 1 constructed in accordance with the teachings of the present invention. The general overall configuration of the animal carrier 1 resembles a rectangular box having longitudinal sides, such as longitudinal side 2, and lateral sides, such as lateral side 3. An aperture 14 (see FIG. 3) is disposed within lateral side 3 and covered by a sliding apertured panel 4. A U-shaped frame 6 is attached to lateral side 3 and includes a groove 5 extending about the interior edge of the frame. Sliding panel 4 slides within groove 5 and is retained adjacent lateral side 3 by frame 6. A screen 7 extends across the aperture within panel 4 and is generally coincident with aperture 14 in lateral side 3. Thereby, fresh air and light is introduced to the interior of animal carrier 1.

If there is a danger of screen 7 being broken either by an animal housed within animal carrier 1 or by forces external to the animal carrier, a solid panel 9 may be substituted for apertured panel 4. Regardless of which panel is used, each of them are secured to frame 6 by a latch 8.

Figure 2:
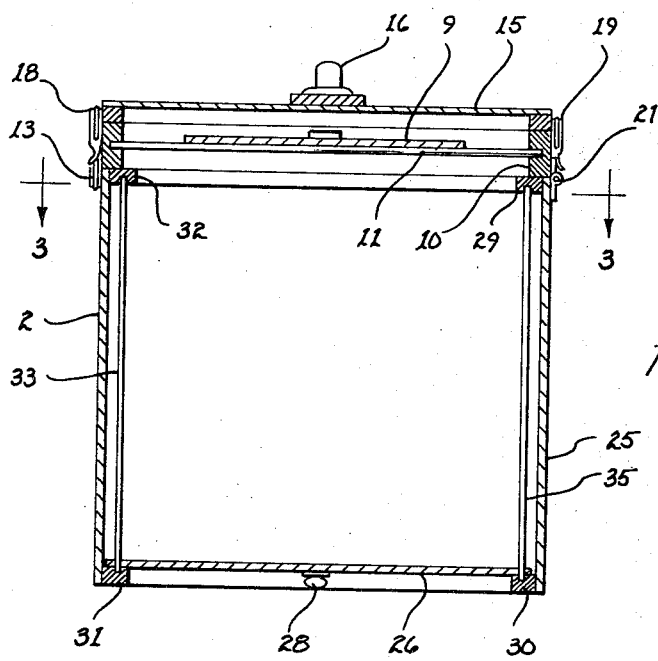
FIG. 2 illustrates a cross-sectional view taken along lines 2—2, as shown in FIG. 1.
Figure 3:
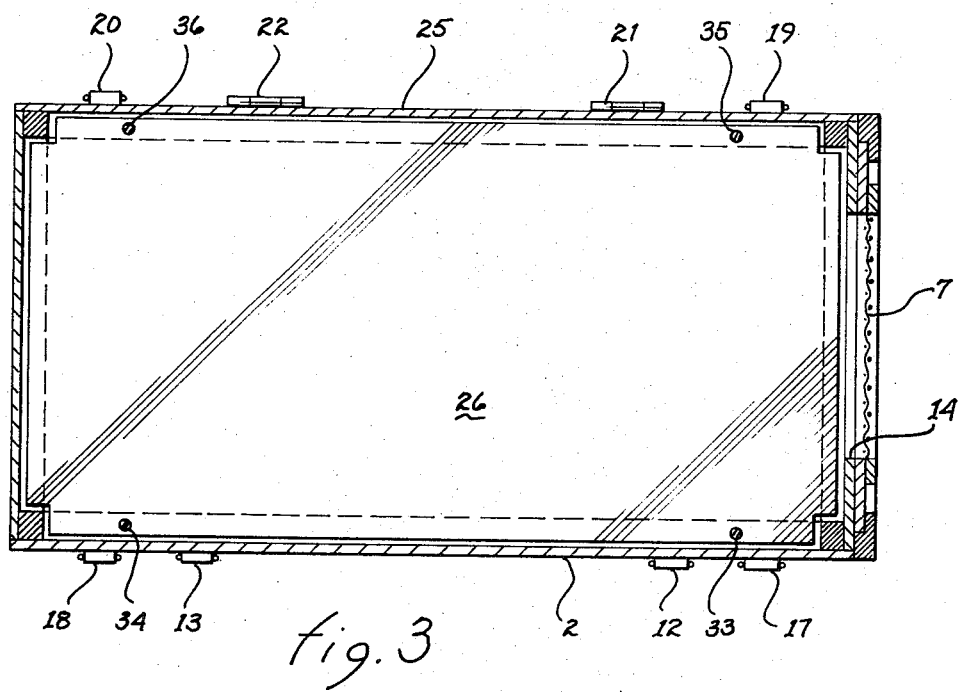
FIG. 3 illustrates a top view of the present invention taken along lines 3—3, as shown in FIG. 2.

A frame 10 having a plurality of bars 11 extending thereacross is secured to the upper edges of the longitudinal and lateral sides. As shown in FIGS. 2 and 3, frame 10 may be secured to longitudinal side 2 by latches 12 and 13 and to longitudinal side 25 by hinges 21 and 22. One of the purposes of frame 10 and the attached bars 11 is that of retaining an animal within animal carrier 1 yet permitting easy insertion or removal of the animal by simply undoing latches 12 and 13 and pivoting frame 10 about hinges 21 and 22. Frame 10, being essentially coincident with the longitudinal and lateral sides of animal carrier 1, permits almost unrestricted access to the interior of the animal container for cleaning and deodorizing purposes.

When the animal carrier 1 is used to transport an animal, it may be necessary to protect the animal from the elements and from the inadvertent dropping of foreign particles upon the animal located beneath bars 11. A cover 15, secured to frame 10 by latches 17, 18, 19 and 20, provides the necessary protection. A handle 16 may be secured to cover 15 to provide a convenient handhold for carrying animal container 1.

When the animal carrier 1 is transported, it is, of course, most convenient if all the parts thereto are kept together. As shown in FIG. 2, the space intermediate bars 11 and cover 15 may be employed to store the unused one of panels 4 and 9.

The movable floor 16 will be discussed in further detail with particular reference to FIGS. 2 and 3. A pair of rods, 33 and 34, are mounted within and extend between longitudinal frame members 29 and 30. A similar pair of rods, 35 and 36 are mounted within and extend between longitudinal frame members 31 and 32. The outline of floor 26 essentially conforms to the interior dimensions of the animal carrier such that it is movable upwardly or downwardly within the carrier without binding. A plurality of apertures are disposed within floor 26, which apertures correspond in size and location to one of rods 33, 34, 35, and 36. The rods, engaging respective ones of the apertures within floor 26, serve as guides to prevent misalignment and/or tilting of the floor as the floor is moved within the animal carrier 1.

When the animal carrier 1 is used to transport an animal or simply as a temporary storage of an animal, floor 26 rests upon and is supported by longitudinal frame members 30 and 31. However, when the animal carrier 1 is to be used as a device for restraining movement of an animal housed therein, the movable feature of floor 26 becomes or primary importance.

Figure 4:
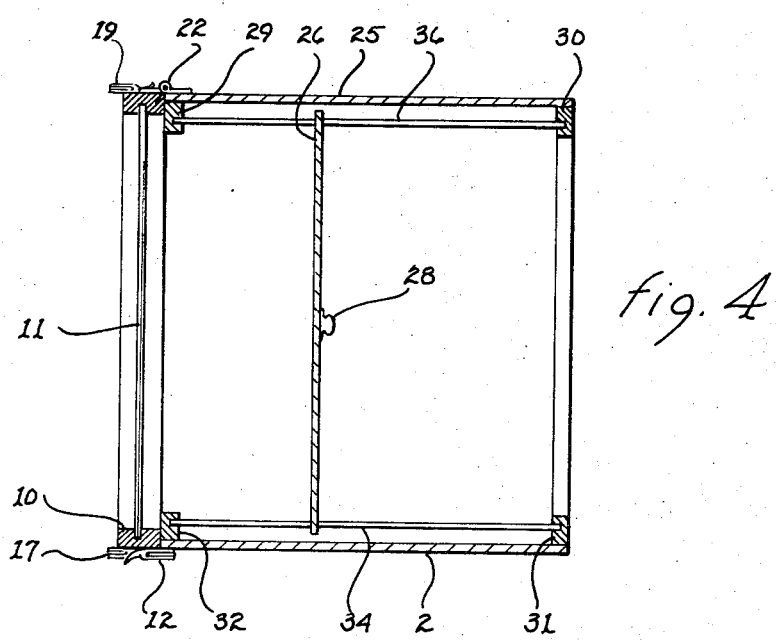
FIG. 4 illustrates the operation of a movable panel for restraining an animal placed within the animal container of the present invention.

In FIG. 4, the animal carrier 1 is shown lying on its side. Thus, floor 26 and bars 11 have become walls of the carrier. In this configuration, floor 26 can be moved toward or away from bars 11 by simply grasping knob 26, located on the outer surface of floor 26, and pushing or pulling. Floor 26 will be guided by the above discussed rods 33, 34, 35 and 36 engaging corresponding apertures within the floor. Thus, there is no danger of floor 26 tilting or pivoting such that the animal located within the carrier could escape.

As floor 26 is pushed toward bars 11, the animal within animal carrier 1 will be forced to move in the same direction until it becomes pinned against the bars. When the animal is firmly lodged against bars 11, it is essentially immobile. Medication may then be administered or medical treatment may be performed on the animal without any fear of the animal suddenly jerking, leaping or causing injury to himself or his handlers.

From the above description, it will be apparent that the animal carrier of the present invention serves several beneficial purposes. First, it provides a means for transporting an animal without any danger of injury to the animal in transit. Second, the animal carrier is readily cleaned and disinfected, thereby promoting a sanitary environment for the animal. Third, the detachable parts of the animal carrier can be attached to or stored within the animal carrier and thereby lessen the change of losing or misplacing essential parts. Fourth, the animal transported within the animal carrier can be acclimatized to the animal carrier so that it will not go into a state of shock or panic when placed in a strange room with strange smells. Fifth, the animal need not be removed from within the animal carrier in order to administer medication or other medical treatment. Sixth, the animal carrier obviates any need for shackling or otherwise attaching restraining devices to maintain the animal in immobile state when the animal is to be treated. Seventh, the restraining apparatus incorporated within the animal carrier permits a near instant release of the animal should an emergency occur.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. An animal carrier for transporting and immobilizing animals, said carrier comprising:
   a. a plurality of interconnected imperforate walls defining the lateral and longitudinal boundaries of said carrier;
   b. an apertured frame pivotally secured to the top of one of said walls and releasably secured to the top of another of said walls;
   c. a detachable cover secured to said frame for providing a solid surface across the top of said carrier to protect an animal within said carrier;
   d. a movable floor slidably mounted within the interior of said walls; and
   e. guide means mounted in said carrier for guiding said entire floor toward and away from said frame while maintaining said floor parallel to said frame; whereby, the animal transported within said carrier is rendered accessible by removing the cover and can be immobilized by moving said floor toward said frame and constraining the animal between said frame and said floor.

2. The combination as set forth in claim 1 wherein an aperture is disposed in one of said walls and said carrier includes a panel having lateral dimensions greater than said aperture, and means secured to said one wall for retaining said panel adjacent said aperture.

3. The combination as set forth in claim 2 wherein said panel includes a further aperture and a screen extending across said further aperture.

4. The combination as set forth in claim 1 wherein said apertured frame comprises a plurality of parallel bars extending across said frame.

5. The combination as set forth in claim 4 wherein an aperture is disposed in one of said walls and said carrier includes a panel having lateral dimensions greater than said aperture, and means secured to said one wall for retaining said panel adjacent said aperture.

6. The combination as set forth in claim 5 including means for storing said panel intermediate said frame and said cover.

7. The combination as set forth in claim 6 further including a handle secured to said cover for transporting said carrier.

* * * * *